(12) United States Patent
Son et al.

(10) Patent No.: US 11,603,018 B2
(45) Date of Patent: Mar. 14, 2023

(54) POWER SUPPLY DEVICE FOR VEHICLE CHILD SEAT

(71) Applicants: HYUNDAI MOTOR COMPANY, Seoul (KR); KIA MOTORS CORPORATION, Seoul (KR)

(72) Inventors: Byeong Seon Son, Seoul (KR); Tae Hoon Lee, Suwon-si (KR); Seon Chae Na, Yongin-si (KR); Ji Hwan Kim, Seoul (KR); Sang Hoon Park, Incheon (KR); Sang Ho Kim, Incheon (KR); Seung Hyun Kim, Daejeon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 114 days.

(21) Appl. No.: 17/217,105

(22) Filed: Mar. 30, 2021

(65) Prior Publication Data

US 2022/0105837 A1    Apr. 7, 2022

(30) Foreign Application Priority Data

Oct. 6, 2020 (KR) .................. 10-2020-0128456

(51) Int. Cl.
*B60N 2/28* (2006.01)
*H01R 13/453* (2006.01)
*B60R 16/03* (2006.01)

(52) U.S. Cl.
CPC ............ *B60N 2/2821* (2013.01); *B60R 16/03* (2013.01); *H01R 13/4532* (2013.01); *H01R 2201/26* (2013.01)

(58) Field of Classification Search
CPC .. B60N 2/2821; B60R 16/03; H01R 13/4532; H01R 2201/26
See application file for complete search history.

(56) References Cited

U.S. PATENT DOCUMENTS

| | | | |
|---|---|---|---|
| 6,419,199 B1 * | 7/2002 | Skofljanec | ........ B60R 21/01556 24/633 |
| 7,224,270 B2 * | 5/2007 | Patterson | ............. B60N 2/2845 280/801.1 |
| 7,288,009 B2 * | 10/2007 | Lawrence | ......... B60R 21/01556 439/824 |
| 7,439,866 B2 * | 10/2008 | Wallner | ............... B60N 2/2821 180/271 |
| 8,007,043 B1 * | 8/2011 | Vuong | ................. B60N 2/2821 297/256.16 |

(Continued)

FOREIGN PATENT DOCUMENTS

CN   205381172 U   7/2016
CN   108544993 A   9/2018
(Continued)

*Primary Examiner* — Philip F Gabler
(74) *Attorney, Agent, or Firm* — McDonnell Boehnen Hulbert & Berghoff LLP (57) ABSTRACT

A power supply device for a vehicle child seat includes an anchor housing mounted on a rear seat, an anchor and a power supply connector, which are positioned within the anchor housing, a latch bar mounted on a child seat and fastened on the anchor in a locked manner, a connector module slidably fastened to the latch bar, and a power connection connector integrally combined with the connector module and removably fastened to the power supply connector.

10 Claims, 5 Drawing Sheets

(56) References Cited

U.S. PATENT DOCUMENTS

| | | | | |
|---|---|---|---|---|
| 8,430,451 | B1* | 4/2013 | Heinz | B60N 2/5685 |
| | | | | 297/180.12 |
| 8,610,569 | B2* | 12/2013 | Lanta | B60N 2/2887 |
| | | | | 340/667 |
| 10,065,529 | B1* | 9/2018 | Miranda Nieto | B60N 2/22 |
| 11,358,499 | B2* | 6/2022 | Thomas | B60N 2/28 |
| 2007/0296254 | A1* | 12/2007 | Kahn | B60N 2/2821 |
| | | | | 297/256.16 |

FOREIGN PATENT DOCUMENTS

| | | |
|---|---|---|
| JP | H11-198695 A | 7/1999 |
| JP | 2001-233093 A | 8/2001 |
| JP | 2001-322469 A | 11/2001 |
| JP | 3815390 B2 | 8/2006 |
| JP | 5203452 B2 | 6/2013 |
| KR | 2016-0046807 A | 4/2016 |
| KR | 2019-0002168 A | 1/2019 |

* cited by examiner

POWER SUPPLY DEVICE FOR VEHICLE CHILD SEAT

CROSS REFERENCE TO RELATED APPLICATIONS

The present application claims priority to Korean Patent Application No. 10-2020-0128456, filed Oct. 6, 2020, the entire contents of which is incorporated herein for all purposes by this reference.

BACKGROUND

Field

The present disclosure relates to a power supply device for a vehicle child seat and, more particularly, to a power supply device for a vehicle child seat, which is capable of supplying electric power to a heating device, an air-conditioning device, and the like that are installed within a child seat.

Description of the Related Art

For an occupant, a heating device for circulating warm air in winter and an air-conditioning device for circulating cool air in summer are built into each of the seats for vehicles that are recently released to market.

However, in a case where a separate child seat is mounted on a rear seat for the vehicle in order to protect an infant from an accident, when a heating device or an air-conditioning device that is built into the rear seat operates, warm air or cool air does not reach the child seat.

In order to prevent this situation, there is a need to separately install a heating device and an air-conditioning device within the child seat.

In addition, in order to change an angle at which the infant sitting on the child seat reclines, there is a need to install a motion control device for reclining.

However, the heating device, the air-conditioning device, and the motion control device, when installed within the child seat, have to be supplied with electric power for operation.

For example, the heating device, the air-conditioning device, the motion control device, and the like, although installed in the child seat, will serve no useful purpose without a power supply device providing electric power thereto. That is, the power supply device has to be installed in the child seat.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a power supply device for a vehicle child seat, in which a power supply connector is mounted into an anchor housing mounted in a rear seat, in which a power connection connector is slidably mounted on a latch bar mounted on a child seat, and in which the power connection connector is removably fastened to the power supply connector. The power supply device is capable of readily supplying electric power for operation from the power supply connector through the power connection connector to power consuming devices (a heating device, an air-conditioning device, and a motion control device) installable in the child seat.

According to an aspect of the present disclosure, there is provided a power supply device for a vehicle child seat, including an anchor housing mounted on a rear seat, an anchor and a power supply connector, which are positioned within the anchor housing, a latch bar mounted on a child seat and fastened on the anchor in a locked manner, a connector module slidably fastened to the latch bar, and a power connection connector integrally combined with the connector module and removably fastened to the power supply connector.

In the power supply, a main cover may be mounted by a hinge mechanism on an entrance end portion of the anchor housing, the main cover being configured to rotate downward when the latch bar is inserted into the anchor housing in order to be fastened to the anchor.

In the power supply device, an auxiliary cover may be mounted by the hinge mechanism in a manner that is positioned adjacent to the main cover, the auxiliary cover being configured to rotate downward when the power connection connector is inserted into the anchor housing in order to be fastened to the power supply connector.

In the power supply device, the latch bar may have a fastening groove in a front end portion thereof, the anchor being inserted into the fastening groove in a locked manner.

In the power supply device, a middle portion of the anchor may be positioned within a rear portion of the anchor housing in a state where the anchor is connected to a vehicle body panel, and the power supply connector may be fixed to an inside wall of the anchor housing in a manner that is positioned adjacent to the anchor.

In the power supply device, the power supply connector may have a female end portion, and the power connection connector may have a male end portion.

In the power supply device, the connector module may include an internal body that has a slide groove therein, the latch bar being inserted into the slide groove, and an external body of which a front end portion is integrally combined with a front end portion of the internal body and of which a rear end portion, covering the internal body, is positioned at a distance away therefrom, in which the power connection connector may protrude from a portion of a front surface of the external body.

In the power supply device, the latch bar may have a hooking hole in a front end portion, and the external body has a hook in a front end portion thereof, the hook being inserted into the hooking hole in a hooked manner.

The power supply device may further include a controller that performs control which interrupts supply of electric power to a heating device and an air-conditioning device in the rear seat when the power connection connector is connected to the power supply connector.

A power supply device according to the present disclosure provides the following advantages.

Firstly, in the power supply device, a power supply connector is mounted into an anchor housing mounted in a rear seat, a power connection connector is slidably mounted on a latch bar mounted on a child seat, and the power connection connector is removably fastened to the power supply connector. Electric power for operation can be readily supplied from the power supply connector through the power connection connector to power consuming devices (a heating device, an air-conditioning device, and a motion control device) installable in the child seat.

Secondly, in a state where the child seat is mounted on the rear seat, when the power connection connector is fastened to the power supply connector, the supply of the electric power for operation to the heating device and the air-conditioning device, mounted in the rear seat, is interrupted. This interruption can reduce unnecessary power consumption and can prevent a fire due to the long-time operation of the heating device in the rear seat.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

A preferable embodiment of the present disclosure will be described in detail below with reference to the accompanying drawings.

Figure 1:
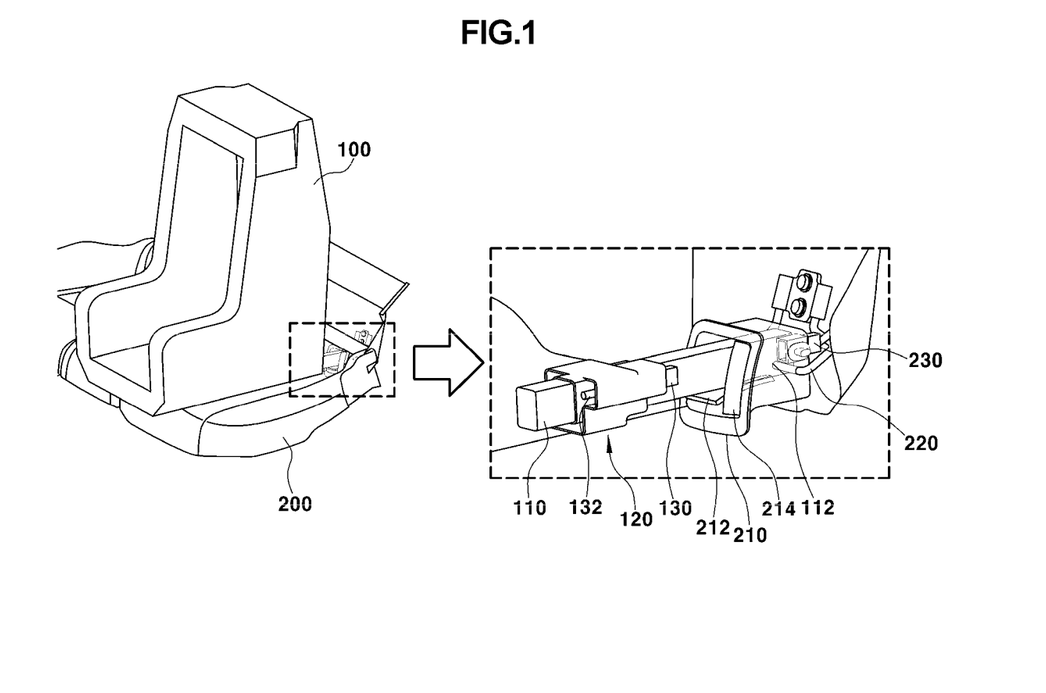
FIG. 1 is a perspective view illustrating a state where a latch bar is fastened into an anchor housing in a power supply device for a vehicle child seat according to the present disclosure, when viewed from the side.
Figure 2:
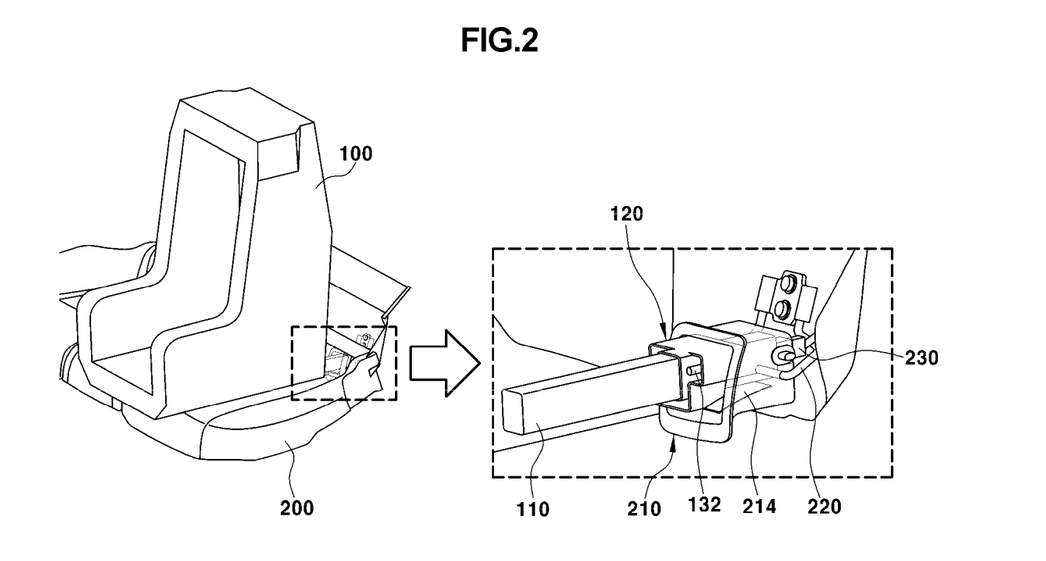
FIG. 2 is a perspective view illustrating a state where a connector module is inserted into the anchor housing in the power supply device for the vehicle child seat according to the present disclosure.

FIGS. 1 and 2 are perspective views each illustrating a power supply device for a vehicle child seat according to the present disclosure. Reference numeral 100 depicts a child seat.

In order to protect an infant from an accident, the child seat 100 is mounted on a rear seat 200.

A latch bar 110, which serves to fix the child seat 100 to the rear seat 200, is provided on a rear surface of the child seat 100.

An anchor housing 210, into which the latch bar 110 is inserted in a locked manner, is mounted on a lower portion of a back of the rear seat 200.

An anchor 220 and a power supply connector 230 are positioned within the anchor housing 210. The latch bar 110 is fastened to the anchor 220 in a locked manner. The power supply connector 230 is for supplying electric power to power consuming devices (a heating device, an air-conditioning device, and a motion control device) that are installable in the child seat 100.

In some embodiments, a middle portion of the anchor 220 is positioned within a rear portion of the anchor housing 210 in a state where the anchor 220 is connected to a vehicle body panel, and that the power supply connector 230 is fixed to an inside wall of the anchor housing 210 in a manner that is positioned in parallel with and adjacent to the anchor 220.

Figure 3:
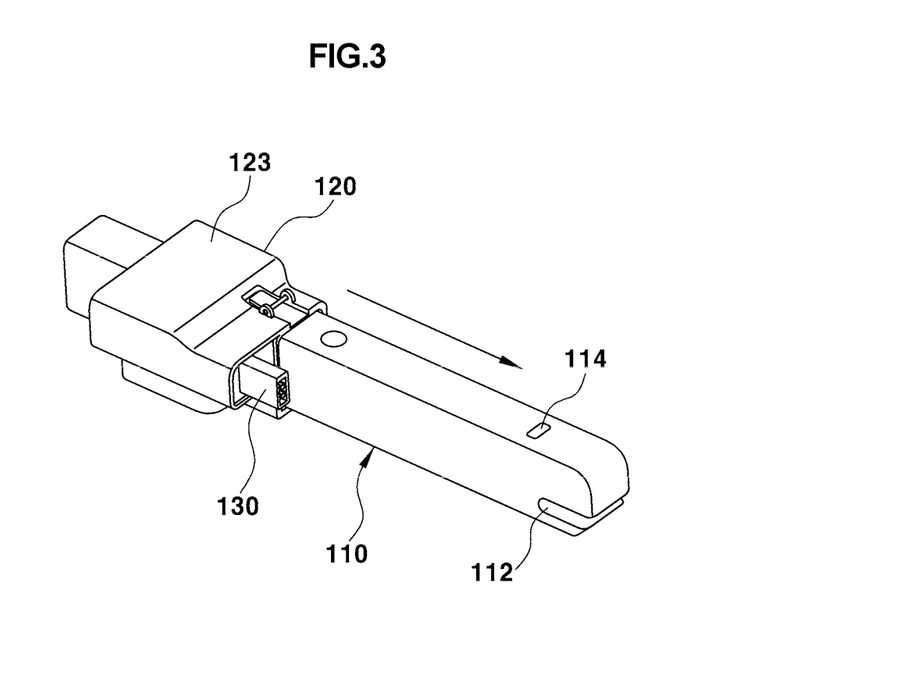
FIG. 3 is a perspective view illustrating a state where the connector module is fastened to the latch bar in a manner that is movable backward and forward, in the power supply device for the vehicle child seat according to the present disclosure.

With reference to FIG. 3, the latch bar 110 of the child seat 100 has a fastening groove 112 in a front end portion thereof. The anchor 220 is inserted into the fastening groove 112 in a hooked manner.

Accordingly, the anchor 220 is inserted into the fastening groove 112 in the latch bar 110 at the same time as the latch bar 110 is inserted into the anchor housing 210. Thus, a lower portion of the child seat is fixed.

Particularly, a connector module 120 is fastened to the latch bar 110 in a manner that is slidable in a forward-backward direction. A power connection connector 130 is integrally combined with the connector module 120. The power connection connector 130 is removably fastened to the power supply connector 230.

More specifically, the connector module 120 includes an internal body 122 and an external body 123. The internal body 122 has a slide groove 121 therein, into which the latch bar 110 is inserted. A front end portion of the external body 123 is integrally combined with a front end portion of the internal body 122, and a rear end portion thereof, covering the internal body 122, is positioned at a distance away therefrom. The power connection connector 130 is integrally combined with a portion of a front surface of the external body 123 in a manner that protrudes therefrom.

Figure 8:
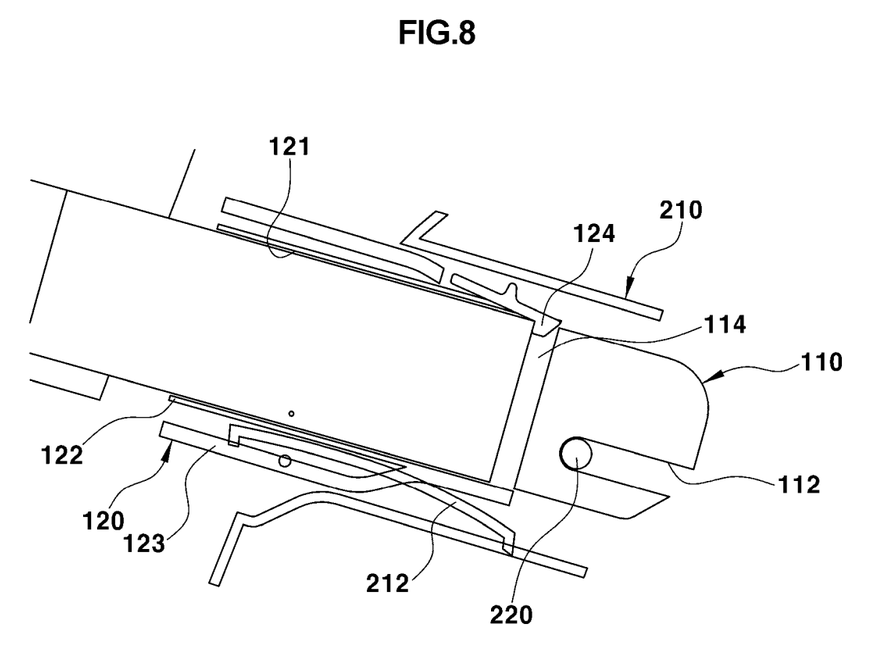
FIG. 8 is a cross-sectional view illustrating a state where the connector module is inserted into the anchor housing and then is fastened to the latch bar in a locked manner.

In this case, the latch bar 110 has a hooking hole 114 in a front end portion. The hooking hole 114 is for fixing the connector module 120 that moves forward along the latch bar 110. As illustrated in FIG. 8, a front portion of the external body 123 of the connector module 120 has a hook 124 on an upper internal surface thereof. The hook 124 is inserted into the hooking hole 114 in a hooked manner.

In order to facilitate fastening the power connection connector 130 to the power supply connector 230, it is preferable that the power supply connector 230 has a female end portion and that the power connection connector 130 has a male end portion.

A main cover 212 is mounted by a hinge mechanism on an entrance end portion of the anchor housing 210. The main cover 212 rotates downward when the latch bar 110 is inserted into the anchor housing 210 in order to be fastened to the anchor 220. In addition, an auxiliary cover 214 is mounted by the hinge mechanism on the entrance end portion thereof in a manner that is positioned adjacent to the main cover 212. The auxiliary cover 214 rotates downward when the power connection connector 130 is inserted into the anchor housing 210 in order to be fastened to the power supply connector 230.

In this case, a return spring is mounted at a position where the main cover 212 and the auxiliary cover 214 are both fastened by the hinge mechanism. The return spring provides an elastic restoration force for returning the main cover 212 and the auxiliary cover 214 to their respective original positions in the closing direction of the entrance end portion.

Assembly and use of the power supply device for the child seat according to the present disclosure, which is configured as described above, will be described below.

Figure 4:
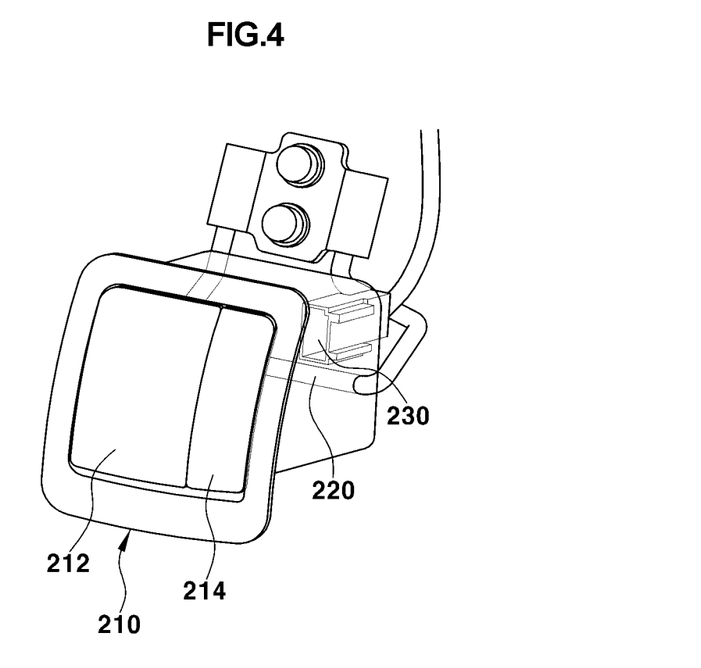
FIGS. 4, 5, and 6 are views each illustrating a state where a main cover and an auxiliary cover are both mounted on the anchor housing in the power supply device for the vehicle child seat according to the present disclosure.

Before the latch bar 110 or the power connection connector 130 is inserted into the anchor housing 210, as illustrated in FIG. 4, the main cover 212 and the auxiliary cover 214, which are mounted on the entrance end portion, keep the entrance end portion of the anchor housing 210 closed.

Figure 5:
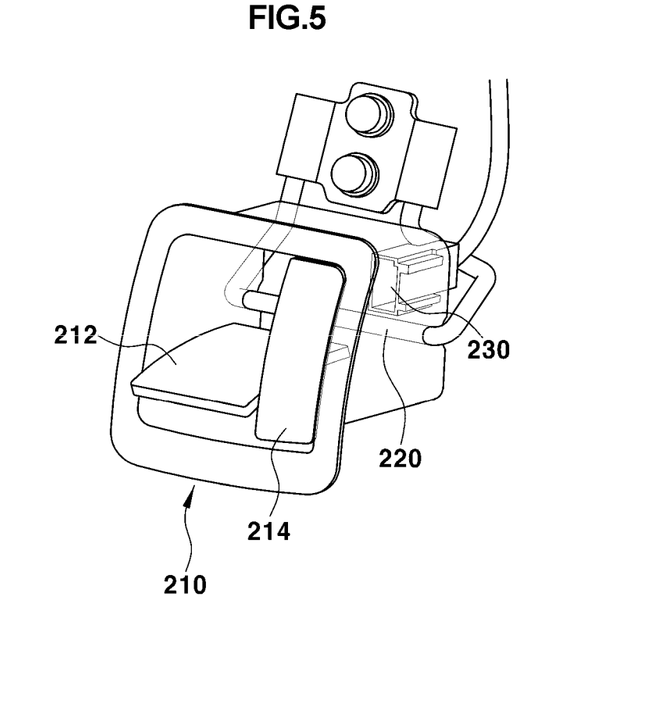

In this state, as illustrated in FIG. 1, when the child seat 100 is stably placed on the rear seat 200 and then the latch bar 110 is inserted into the anchor housing 210, the latch bar 110 pushes forward the main cover 212, and as illustrated in FIG. 5, only the main cover 212 mounted on the entrance end portion of the anchor housing 210 rotates downward.

Subsequently, the latch bar 110 is further pushed forward so that the anchor 220 is inserted into the fastening groove 112 in the latch bar 110. Thus, the lower portion of the child seat is fixed.

Accordingly, the auxiliary cover 214, as illustrated in FIG. 5, keeps the entrance end portion of the anchor housing 210 closed. Thus, the power supply connector 230 is protected.

When the power connection connector 130 of the connector module 120 is not inserted into the anchor housing 210, due to the elastic restoration force, the auxiliary cover 214 keeps the entrance end portion of the anchor housing 210 closed in order to cover the power supply connector 230 for protection.

On the other hand, in order to supply electric power to the power consuming devices (the heating device, the air-conditioning device, and the motion control device) that are installable in the child seat 100, the power connection connector 130 has to be fastened to the power supply connector 230 that is connected by wires to a battery.

To this end, the connector module 120 is moved forward along the latch bar 110, and as illustrated in FIG. 8, the hook 124 on the external body 123 of the connector module 120 is inserted in a hooked manner into the hooking hole 114 in a front end portion of the latch bar 110.

Figure 6:
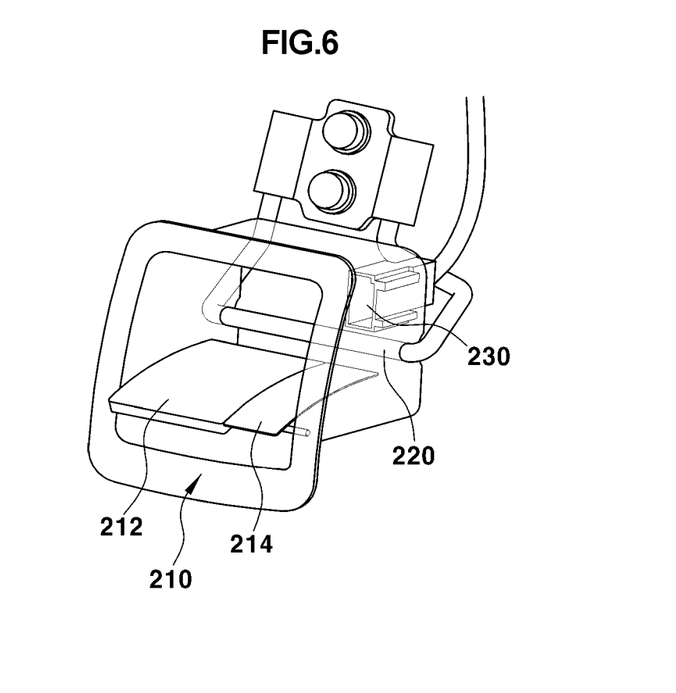

Subsequently, as illustrated in FIG. 2, when the child seat 100 is stably placed on the rear seat 200 and then the latch bar 110 and the connector module 120 are inserted into the anchor housing 210 at the same time, as illustrated in FIG. 6, the main cover 212 and the auxiliary cover 214 mounted on the entrance end portion of the anchor housing 210 are both pushed and rotate backward.

Subsequently, when the latch bar 110 and the connector module 120 are further pushed, the power connection connector 130 is fastened to the power supply connector 230 at the same time as the anchor 220 is inserted into the fastening groove 112 in the latch bar 110.

Figure 7:
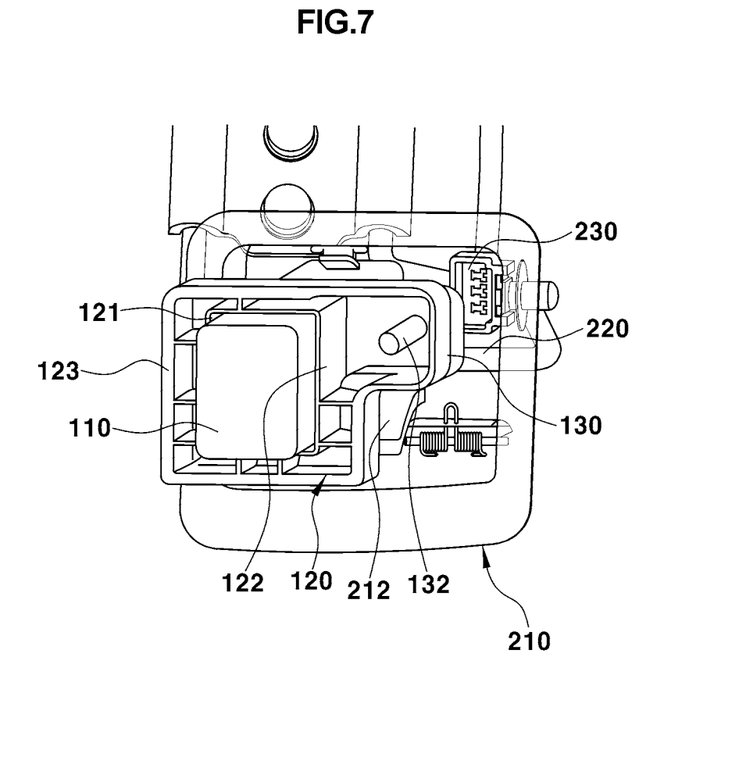
FIG. 7 is a perspective view illustrating a state where the connector module and the latch bar are inserted into the anchor housing in the power supply device for the vehicle child seat according to the present disclosure, when viewed from behind the connector module.

Therefore, electric power of the battery can be supplied from the power supply connector 230 to the power connection connector 130. As illustrated in FIG. 7, the electric power can be readily supplied through a wire 132 connected to a rear surface of the power connection connector 130 to the power consuming devices (the heating device, the air-conditioning device, and the motion control device) that are installable in the child seat 100.

The heating device, the air-conditioning device, and the like are turned on or off under the control of a controller.

In a state where the child seat is mounted on the rear seat, when the heating device or the air-conditioning device, which is mounted on the rear seat, is turned on under the control of the controller, warm or cooling air does not reach the child seat. Therefore, it is preferable that, in the state where the child seat is mounted on the rear seat, the heating device or the air-conditioning device, which is mounted on the rear seat, is turned off.

To this end, the controller is set to perform control that powers off the heating device or the air-conditioning device in the rear seat when the power connection connector 130 is connected to the power supply connector 230. This can reduce unnecessary power consumption and can prevent a fire due to the operation of the heating device in the rear seat for a long time.

The controller is configured in such a manner that, when the power connection connector 130 is connected to the power supply connector 230, control is performed that allows electric power to be supplied to the power consuming devices, such as the heating device, the air-conditioning device, and the motion control device for controlling positioning of the child seat, which can be installable in the child seat 100.

Accordingly, the electric power of the battery can be supplied from the power supply connector 230 to the power connection connector 130. At the same time, the electric power of the battery can be readily supplied, through the wire 132 connected to the rear surface of the power connection connector 130, to the power consuming devices (the heating device, the air-conditioning device, and the motion control device) that are installable in the child seat 100.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

The invention claimed is:

1. A power supply device for a child seat, the power supply device comprising:
   an anchor housing mounted on a rear seat of a vehicle;
   an anchor and a power supply connector each positioned within the anchor housing;
   a latch bar mounted on the child seat and fastened on the anchor in a locked manner;
   a connector module slidably fastened to the latch bar; and
   a power connection connector integrally combined with the connector module and removably fastened to the power supply connector.

2. The power supply device of claim 1, wherein a main cover is mounted by a hinge mechanism on an entrance end portion of the anchor housing, the main cover being configured to rotate downward when the latch bar is inserted into the anchor housing in order to be fastened to the anchor.

3. The power supply device of claim 2, wherein an auxiliary cover is mounted by the hinge mechanism adjacent to the main cover, the auxiliary cover being configured to rotate downward when the power connection connector is inserted into the anchor housing in order to be fastened to the power supply connector.

4. The power supply device of claim 3, wherein the auxiliary cover keeps the entrance end portion of the anchor housing closed to cover the power supply connector for protection when the power connection connector is not inserted into the anchor housing.

5. The power supply device of claim 2, wherein the latch bar has a fastening groove in a front end portion, the anchor being inserted into the fastening groove in a locked manner.

6. The power supply device of claim 1, wherein a middle portion of the anchor is positioned within a rear portion of the anchor housing in a state where the anchor is connected to a vehicle body panel, and
   wherein the power supply connector is fixed to an inside wall of the anchor housing adjacent to the anchor.

7. The power supply device of claim 1, wherein the power supply connector has a female end portion, and
   the power connection connector has a male end portion.

8. The power supply device of claim 1, wherein the connector module comprises:
   an internal body having a slide groove, the latch bar being inserted into the slide groove; and
   an external body having a front end portion integrally combined with a front end portion of the internal body, and having a rear end portion covering the internal body positioned at a distance away therefrom, wherein the power connection connector protrudes from a portion of a front surface of the external body.

9. The power supply device of claim 8, wherein the latch bar has a hooking hole in a front end portion, the external body has a hook in a front end portion, the hook being inserted into the hooking hole.

10. The power supply device of claim 1, further comprising:
   a controller configured to control supply of electric power to a heating device and an air-conditioning device which is mounted on in the rear seat, as well as to a device for driving which can be installable on the child seat, when the power connection connector is connected to the power supply connector.

* * * * *